(12) United States Patent
Rahkonen et al.

(10) Patent No.: US 11,483,394 B2
(45) Date of Patent: Oct. 25, 2022

(54) DELAYED PROXY-LESS NETWORK ADDRESS TRANSLATION DECISION BASED ON APPLICATION PAYLOAD

(71) Applicant: Forcepoint LLC, Austin, TX (US)

(72) Inventors: Valtteri Rahkonen, Helsinki (FI); Tuomo Syvänne, Helsinki (FI)

(73) Assignee: Forcepoint LLC, Austin, TX (US)

( * ) Notice: Subject to any disclaimer, the term of this patent is extended or adjusted under 35 U.S.C. 154(b) by 217 days.

(21) Appl. No.: 15/892,079

(22) Filed: Feb. 8, 2018

(65) Prior Publication Data

US 2019/0245930 A1 Aug. 8, 2019

(51) Int. Cl.
*H04L 67/141* (2022.01)
*H04L 67/01* (2022.01)

(52) U.S. Cl.
CPC ............ *H04L 67/141* (2013.01); *H04L 67/01* (2022.05)

(58) Field of Classification Search
USPC ......................................... 709/203, 220–229
See application file for complete search history.

(56) References Cited

U.S. PATENT DOCUMENTS

| | | | | |
|---|---|---|---|---|
| 2002/0059428 A1* | 5/2002 | Susai | .................. | H04L 67/1008 709/227 |
| 2002/0194342 A1* | 12/2002 | Lu | ....................... | H04L 67/1004 709/227 |
| 2004/0249948 A1* | 12/2004 | Sethi | .................... | H04L 67/2876 709/227 |
| 2010/0180048 A1* | 7/2010 | Guo | ......................... | H04L 45/38 709/250 |
| 2015/0180767 A1* | 6/2015 | Tam | ...................... | H04L 45/123 370/389 |
| 2015/0215345 A1* | 7/2015 | Agarwal | ............... | H04L 69/163 709/227 |
| 2018/0375967 A1* | 12/2018 | Pithawala | ............. | H04L 69/161 |
| 2019/0215308 A1* | 7/2019 | Feyzibehnagh | ..... | H04L 63/0428 |

OTHER PUBLICATIONS

U.S. Appl. No. 62/524,278, filed Jul. 2017, Pithawala; Burjiz.*

* cited by examiner

*Primary Examiner* — Younes Naji
(74) *Attorney, Agent, or Firm* — Jackson Walker L.L.P.

(57) ABSTRACT

A method, system, and computer-usable medium are disclosed for, responsive to communication of a client handshake to a server for establishing communications between the client and server, managing handshake messages between the client and server until an application layer message is communicated from the client, such that a connection between the client and the server appears to be established, and responsive to communication of the application layer message from the client, rendering a policy decision with respect to a connection between the client and the server based on a payload of the application layer message, the policy decision defining a selected path between the client and the server and including a chosen target device from a plurality of potential target devices, wherein the chosen target device is within the selected path and establishing the selected path for communication between the client and the server in accordance with the policy decision.

21 Claims, 6 Drawing Sheets

DELAYED PROXY-LESS NETWORK ADDRESS TRANSLATION DECISION BASED ON APPLICATION PAYLOAD

FIELD OF DISCLOSURE

The present invention relates in general to the field of computers and similar technologies, and in particular to software utilized in this field. Still more particularly, it relates to a method, system, and computer-usable medium for performing a delayed proxy-less network address translation decision based on an application payload.

BACKGROUND

During a handshake from a client device to a server device in a network, a security device may not have sufficient enough information to make desirable policy decisions. For example, it may be desirable to choose a path, network link, or tunnel based on an application payload. As a specific example, it may be desirable in a business enterprise to have business-oriented traffic (e.g., cloud-based productivity software) routed over higher-quality network connections while having non-business-oriented traffic (e.g., social networking sites, media streaming sites, etc.) directed through lower-cost, lower-quality network connections.

However, using existing techniques, choosing a target node of a path, network link, or tunnel for traffic after a connection has been established based on an application payload requires significant complication and difficulty, as doing so may require extensive transport layer protocol modification and application layer payload buffering capabilities in order to be able to modify and buffer the traffic at the beginning of a connection and then later handle the connection as transparently as possible for providing similar performance and behavior for the end points than when a connection is handled transparently from the beginning.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include, responsive to communication of a client handshake from a client to a server for establishing communications between the client and the server, managing handshake messages between the client and the server until an application layer message is communicated from the client, such that during the managing of the handshake messages, from a perspective of the client, a connection between the client and the server appears to be fully established. The method may also include, responsive to communication of the application layer message from the client, rendering a policy decision with respect to a connection between the client and the server based on a payload of the application layer message, the policy decision defining a selected path between the client and the server and including a chosen target device from a plurality of potential target devices, wherein the chosen target device is within the selected path, and establishing the selected path for communication between the client and the server in accordance with the policy decision.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for, responsive to communication of a client handshake from a client to a server for establishing communications between the client and the server, managing handshake messages between the client and the server until an application layer message is communicated from the client, such that during the managing of the handshake messages, from a perspective of the client, a connection between the client and the server appears to be fully established. The instructions may also be configured for, responsive to communication of the application layer message from the client, rendering a policy decision with respect to a connection between the client and the server based on a payload of the application layer message, the policy decision defining a selected path between the client and the server and including a chosen target device from a plurality of potential target devices, wherein the chosen target device is within the selected path, and establishing the selected path for communication between the client and the server in accordance with the policy decision.

In accordance with these and other embodiments of the present disclosure, a non-transitory, computer-readable storage medium may embody computer program code, the computer program code comprising computer executable instructions configured for, responsive to communication of a client handshake from a client to a server for establishing communications between the client and the server, managing handshake messages between the client and the server until an application layer message is communicated from the client, such that during the managing of the handshake messages, from a perspective of the client, a connection between the client and the server appears to be fully established. The instructions may also be configured for, responsive to communication of the application layer message from the client, rendering a policy decision with respect to a connection between the client and the server based on a payload of the application layer message, the policy decision defining a selected path between the client and the server and including a chosen target device from a plurality of potential target devices, wherein the chosen target device is within the selected path, and establishing the selected path for communication between the client and the server in accordance with the policy decision.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
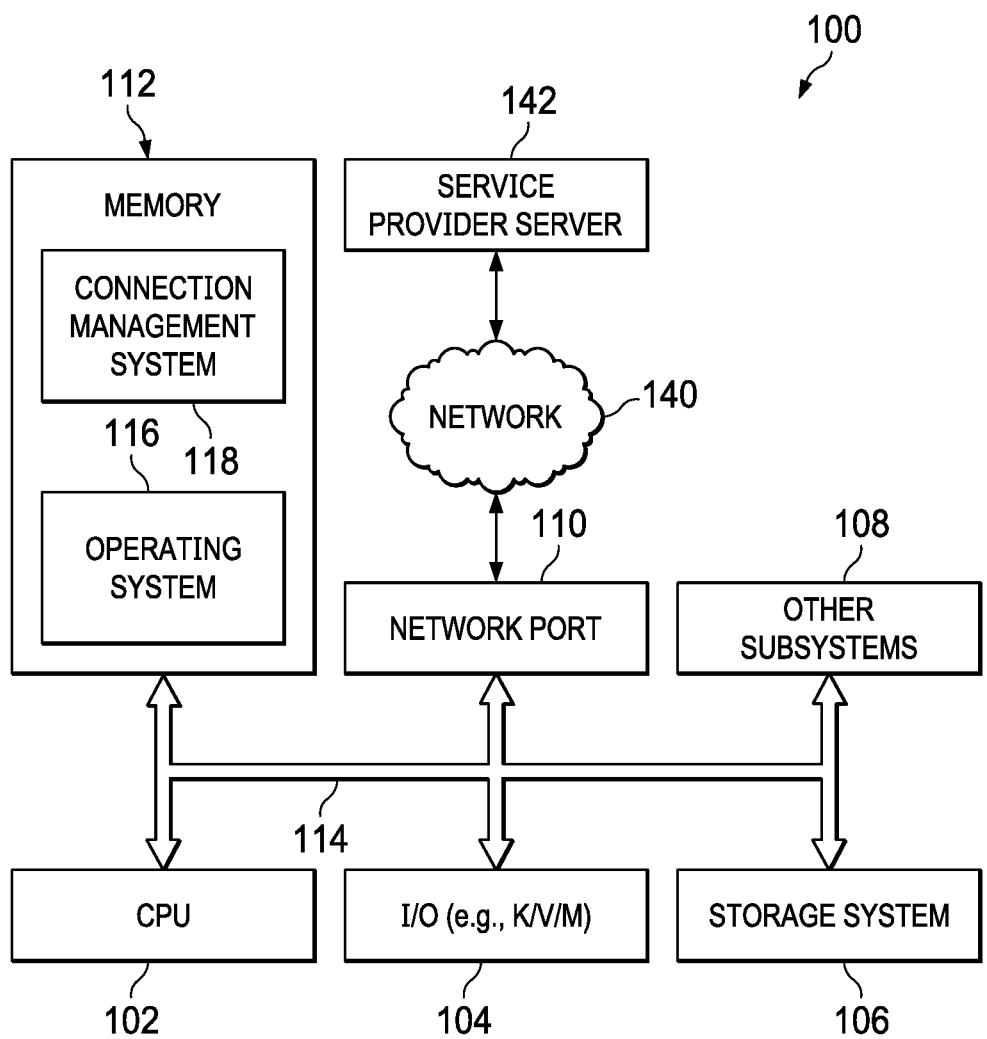
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a connection management system 118. In some embodiments, information handling system 100 may be able to download connection management system 118 from service provider server 142. In other embodiments, connection management system 118 may be provided as a service from the service provider server 142.

In various embodiments, connection management system 118 may be configured to enforce a network security policy related to network communications between an external network (e.g., external network 202 in FIG. 2) and endpoint device (e.g., endpoint device 244 or 246 in FIG. 2), as described in greater detail elsewhere in this disclosure. In particular, connection management system 118 may be configured to, responsive to receipt of a handshake message from an endpoint device to a server, partially open a plurality of connections to potential target devices and await the endpoint device's first application layer protocol message in order to analyze an application payload of the traffic from the endpoint to render a policy decision regarding which of the potential target devices to choose for a path between the endpoint device and the server. In some embodiments, connection management system 118 and the functionality thereof may improve processor efficiency, and thus the efficiency of information handling system 100, by performing network security operations with greater efficiency and with decreased processing resources as compared to existing approaches for similar network security operations. In these and other embodiments, connection management system 118 and the functionality thereof may improve effectiveness in ensuring network security, and thus the effectiveness of information handling system 100, by performing network security operations with greater effectiveness to existing approaches for similar network security operations. As will be appreciated, once information handling system 100 is configured to perform the functionality of connection management system 118, information handling system 100 becomes a specialized computing device specifically configured to perform the functionality of connection management system 118, and is not a general purpose computing device. Moreover, the implementation of functionality of connection management system 118 on information handling system 100 improves the functionality of information handling system 100 and provides a useful and concrete result of improving network security by analyzing encrypted traffic and performing proactive server identity verification in order make policy decisions with respect to the traffic.

Figure 2:
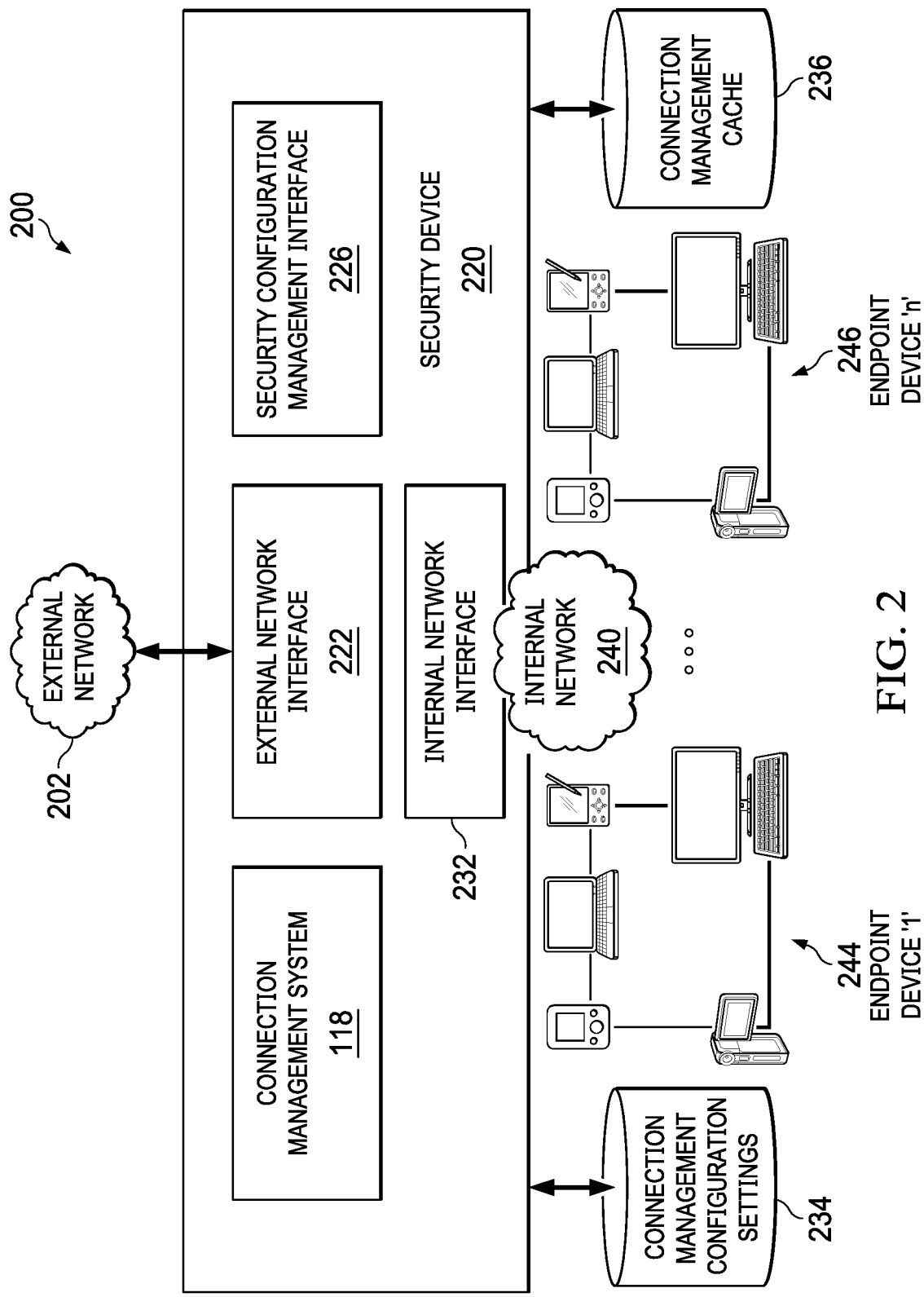
FIG. 2 illustrates a block diagram of a system for performing a delayed proxy-less network address translation decision based on an application payload, in accordance with embodiments of the present disclosure.

FIG. 2 illustrates a block diagram of a system 200 for performing a delayed proxy-less network address translation decision based on an application payload, in accordance with embodiments of the present disclosure. In some embodiments, a security device 220 may include an external network interface 222, a security configuration management interface 226, an internal network interface 232, and a connection management system 118. Security device 220 may be implemented using any suitable information handling system 100, including without limitation a firewall, an intrusion prevention system, an intrusion detection system, or any other suitable security device capable of implementing connection management system 118. In some embodiments, security device 220 may be implemented as an individual security device 220, a virtual context security device 220, or a security device 220 cluster.

Security device 220 may also include in some embodiments a repository of connection management configuration settings 234 and a connection management cache 236. In certain embodiments, security configuration management interface 226 may be implemented to receive instructions relating to network security policy decisions from connection management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to choose a path for network communications based on an application payload of the network communications. Known approaches for choosing a path for network communications based on an application payload of the network communications require extensive transport layer protocol modification and application layer payload buffering capabilities in order to be able to modify and buffer the traffic at the beginning of a connection and then later handle the connection as transparently as possible for providing similar performance and behavior for the end points than when a connection is handled transparently from the beginning. Those of skill in the art may appreciate that use of such an approach may provide desired application-based transmission of traffic through a desired path, but such approaches may not be not useful in all cases, and often require compute-intensive resources.

In operation, connection management system 118 may, responsive to receipt of a handshake message from an endpoint device to a server, partially open a plurality of connections to potential target devices and await the endpoint device's first application layer protocol message in order to analyze an application payload of the traffic from the endpoint to render a policy decision regarding which of the potential target devices to choose for a path between the endpoint device and the server. Connection management system 118 may also include functionality such as that described with respect to methods 300 and 400, described in detail below.

Figure 3:
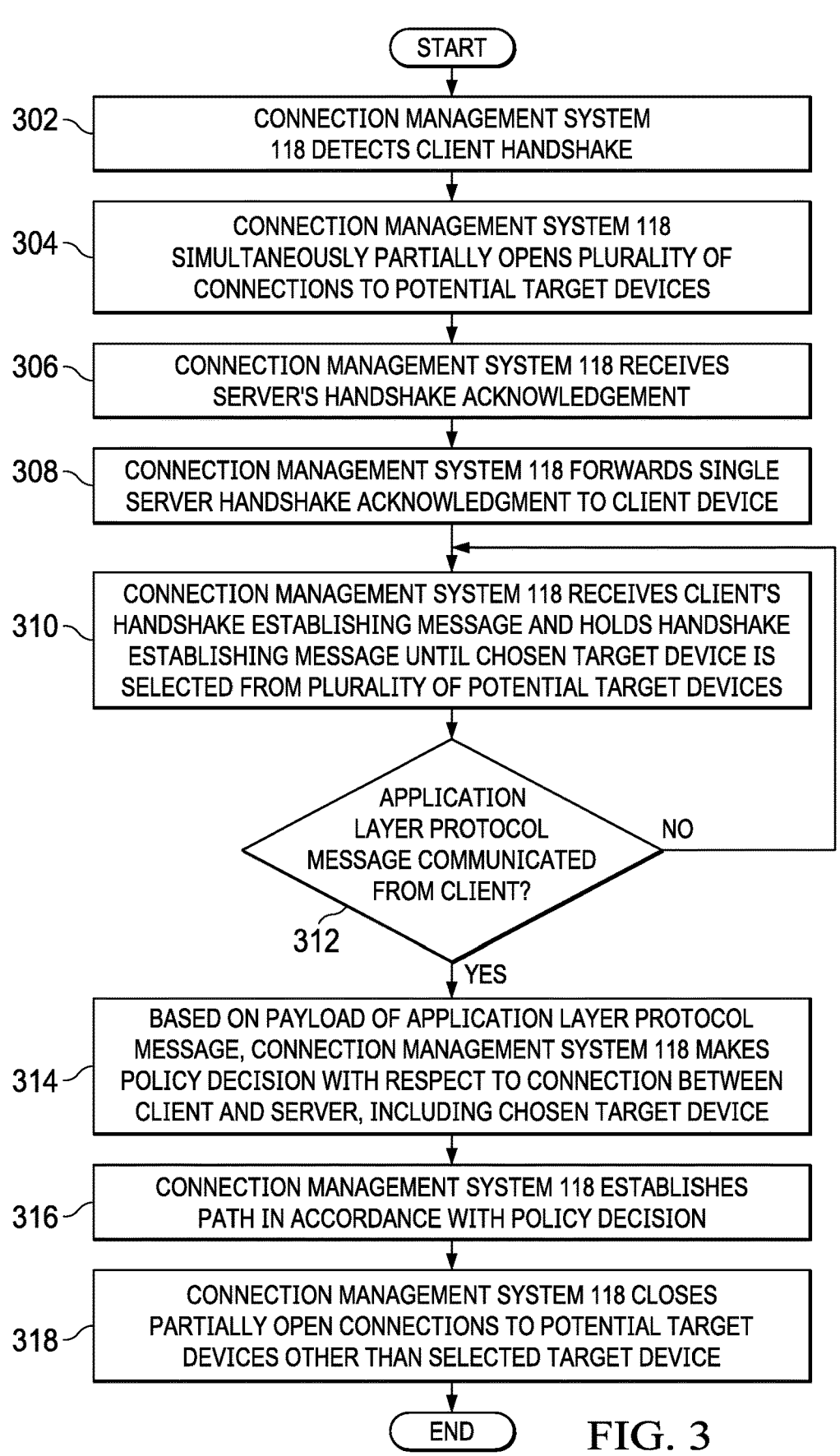
FIG. 3 illustrates a flow chart of an example method for performing a delayed proxy-less network address translation decision based on an application payload, in accordance with embodiments of the present disclosure.

FIG. 3 illustrates a flow chart of an example method 300 for performing a delayed proxy-less network address translation decision based on an application payload, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, connection management system 118 may detect a client handshake (e.g., a Transport Communication Protocol (TCP) SYN message) communicated from an endpoint device 244, 246 intended for a server within external network 202. At step 304, responsive to detecting the client handshake, connection management system 118 may simultaneously partially open a plurality of connections, each connection to a potential target device. Each potential target device may comprise a device within external network 202 through which a communication path may be established between the client device initiating the handshake and the server. In other words, each potential target device may be a "next hop" from the client in the communication path. In operation, each of the plurality of connections may be formed by communicating the client handshake to each potential target with unsupported communications options (e.g., unsupported TCP options) removed from the client handshake to allow for connection management system 118 to later modify the communication stream once a chosen target device is selected from the plurality of potential target devices.

At step 306, connection management system 118 may receive the server's handshake acknowledgement (e.g., TCP SYN ACK message) from one of the potential target devices. At step 308, in response to receiving the handshake acknowledgement, connection management system 118 may forward a single server handshake acknowledgment to the client device. In operation, unsupported communications options (e.g., unsupported TCP options) may be removed from the server handshake acknowledgement to allow for connection management system 118 to later modify the communication stream once a chosen target device is selected from the plurality of potential target devices.

At step 310, connection management system 118 may receive the client's handshake establishing message (e.g., client's TCP ACK message), but may hold such handshake establishing message until the chosen target device is selected from the plurality of potential target devices.

At step 312, connection management system 118 may monitor communications from the client to the server until such time as an application layer protocol message is communicated from the client. During this step, connection management system 118 may need to actively receive an application layer protocol message, meaning it may need to process communications from the client and communicate one or more handshake acknowledgement messages to the client in order to receive enough data from the client to make a policy decision. Once connection management system 118 receives an application layer protocol message from the client, method 300 may proceed to step 314.

At step 314, based on payload of the application layer protocol message, connection management system 118 may make a policy decision with respect to the connection between the client and the server, the policy decision defining a selected path between client and server including a chosen target device from the plurality of potential target devices. At step 316, connection management system 118 may establish a path in accordance with the policy decision, including synchronizing and/or scaling communication windows (e.g., TCP windows), performing communication sequence number rewriting (e.g., TCP sequence number rewriting) to handle sequence offsets, rewriting or modifying packet headers, and/or performing any other suitable processing for establishing the path.

At step 318, connection management system 118 may close partially open connections to the potential target devices other than the selected target device. For example, in TCP implementations, connection management system 118 may communicate TCP RST messages to such potential target devices. After step 318, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, connection management system 118 executing thereon, and/or any other system operable to implement method 300. In certain embodiments, method 300 may be implemented partially or fully in software and/or firmware embodied in computer-readable media.

Method 300 discussed above contemplates a plurality of connections being opened to a plurality of target devices wherein a policy decision is made by connection management system 118. However, in some embodiments, as described below with respect to method 400, connection management system 118 may initially open a connection to a single target device at which the policy decision is made, and then the target may be switched in the event that the path defined by the policy decision includes a selected target device other than the initial single target device.

Figure 4:
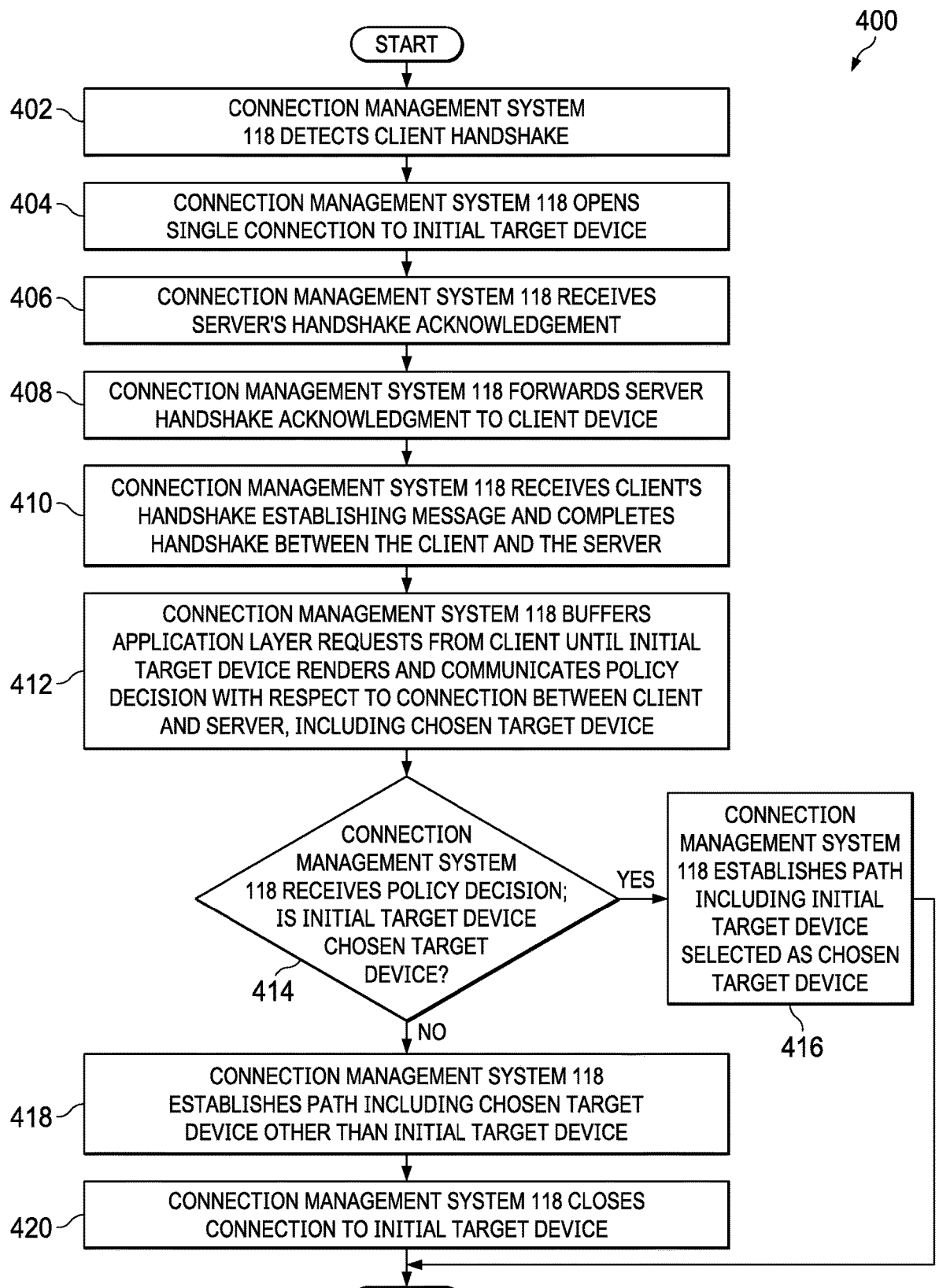
FIG. 4 illustrates a flow chart of another example method for performing a delayed proxy-less network address translation decision based on an application payload, in accordance with embodiments of the present disclosure.

FIG. 4 illustrates a flow chart of another example method 400 for performing a delayed proxy-less network address translation decision based on an application payload, in accordance with embodiments of the present disclosure. According to some embodiments, method 400 may begin at step 402. As noted above, teachings of the present disclosure may be implemented in a variety of configurations of information handling system 100. As such, the preferred initialization point for method 400 and the order of the steps comprising method 400 may depend on the implementation chosen.

At step 402, connection management system 118 may detect a client handshake (e.g., a Transport Communication Protocol (TCP) SYN message) communicated from an endpoint device 244, 246 intended for a server within external network 202. At step 404, responsive to detecting the client handshake, connection management system 118 may open a single connection to an initial target device. In some embodiments, the initial target device may comprise a device within external network 202 through which a communication path may be established between the client device initiating the handshake and the server. In other words, the initial target device may be a possible "next hop" from the client in the communication path. In other embodiments, the initial target device may include a device specially adapted to perform an external service, such as a content inspection proxy service. In operation, the connection may be formed by communicating the client handshake to the initial target device with unsupported communications options (e.g., unsupported TCP options) removed from the client handshake to allow for connection management system 118 to later modify the communication stream in the event a chosen target device other than the initial target device is selected.

At step 406, connection management system 118 may receive the server's handshake acknowledgement (e.g., TCP SYN ACK message) from the initial target device. At step 408, in response to receiving the handshake acknowledgement, connection management system 118 may forward the server handshake acknowledgment to the client device. In operation, unsupported communications options (e.g., unsupported TCP options) may be removed from the server handshake acknowledgment to allow for connection management system 118 to later modify the communication stream in the event a chosen target device other than the initial target device is selected.

At step 410, connection management system 118 may receive the client's handshake establishing message (e.g., client's TCP ACK message), and may complete the handshake between the client and the server.

At step 412, connection management system 118 may buffer application layer requests from the client until the initial target device renders and communicates a policy decision with respect to the connection between the client and the server, the policy decision defining a selected path between client and server including a chosen target device. At step 414, connection management system 118 may receive the policy decision and determine whether the chosen target device defined by the policy decision includes the initial target device or another device. If the chosen target device comprises the initial target device, method 400 may proceed to step 416. Otherwise, if the chosen target device is another device, method 400 may proceed to step 418.

At step 416, connection management system 118 may establish a path including the initial target device selected as the chosen target device. After completion of step 416, method 400 may end.

At step 418, connection management system 118 may establish a path including the chosen target device other than the initial target device. At step 420, connection management system 118 may close the connection to the initial target device (e.g., by communicating TCP RST messages to the initial target device). After step 420, method 400 may end.

In either of the cases described in steps 416 and 418, establishing the path in accordance with the policy decision may include synchronizing and/or scaling communication windows (e.g., TCP windows), performing communication sequence number rewriting (e.g., TCP sequence number rewriting) to handle sequence offsets, rewriting or modifying packet headers, and/or performing any other suitable processing for establishing the path.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using CPU 102, connection management system 118 executing thereon, and/or any other system operable to implement method 400. In certain embodiments, method 400 may be implemented partially or fully in software and/or firmware embodied in computer-readable media.

Figure 5:
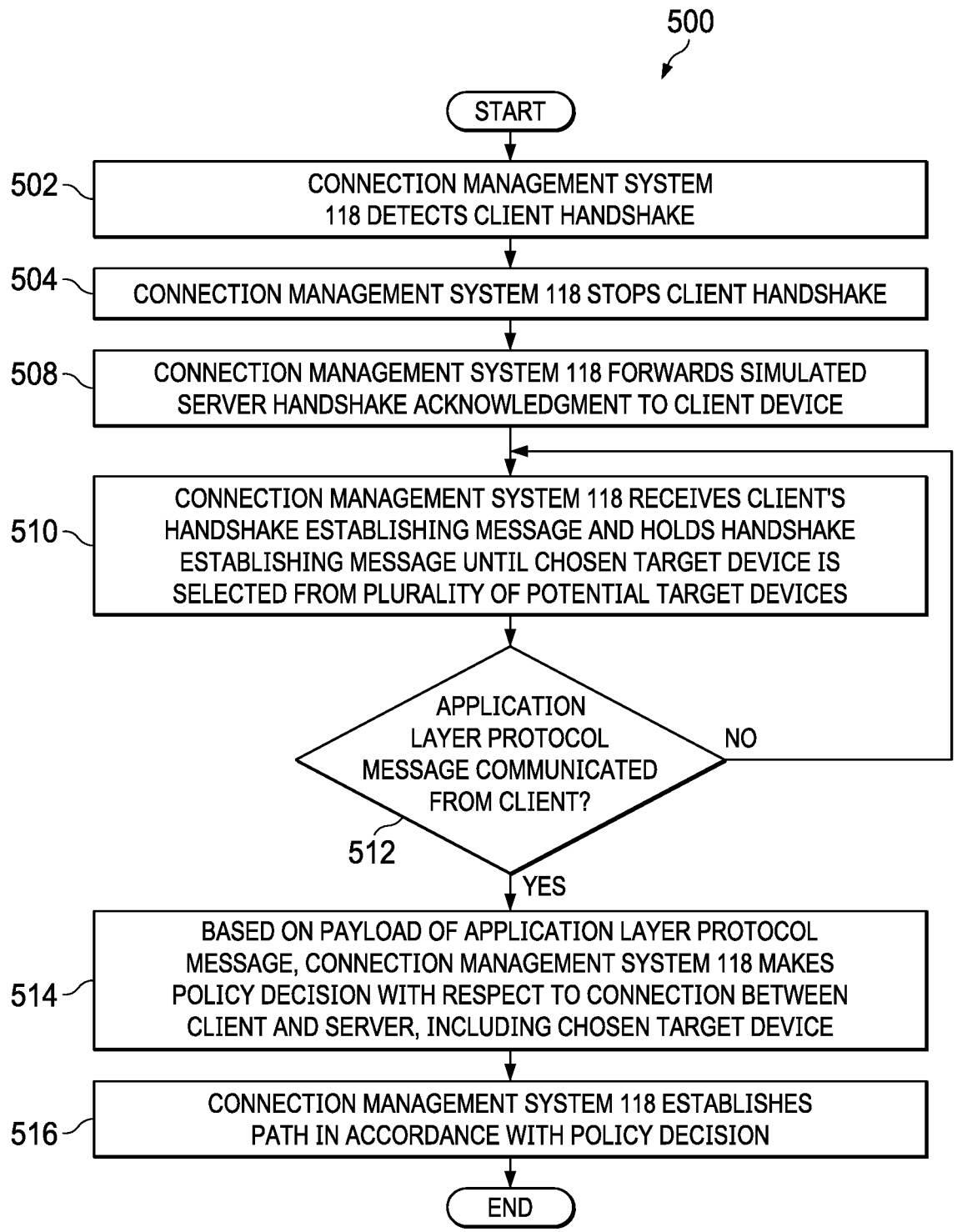
FIG. 5 illustrates a flow chart of an example method for performing a delayed proxy-less network address translation decision based on an application payload, in accordance with embodiments of the present disclosure.

FIG. 5 illustrates a flow chart of another example method 500 for performing a delayed proxy-less network address translation decision based on an application payload, in accordance with embodiments of the present disclosure. According to some embodiments, method 500 may begin at step 502. As noted above, teachings of the present disclosure may be implemented in a variety of configurations of information handling system 100. As such, the preferred initialization point for method 500 and the order of the steps comprising method 500 may depend on the implementation chosen.

At step 502, connection management system 118 may detect a client handshake (e.g., a Transport Communication Protocol (TCP) SYN message) communicated from an endpoint device 244, 246 intended for a server within external network 202. At step 504, responsive to detecting the client handshake, connection management system 118 may store the client handshake. At step 508, connection management system 118 may forward a simulated server handshake acknowledgment to the client device. In operation, unsupported communications options (e.g., unsupported TCP options) may be removed from the server handshake acknowledgement to allow for connection management system 118 to later modify the communication stream once a chosen target device is selected from a plurality of potential target devices.

At step 510, connection management system 118 may receive the client's handshake establishing message (e.g., client's TCP ACK message), but may hold such handshake establishing message until the chosen target device is selected from the plurality of potential target devices.

At step 512, connection management system 118 may monitor and store communications from the client to the server until such time as an application layer protocol message is communicated from the client. During this step, connection management system 118 may need to actively receive an application layer protocol message, meaning it may need to process communications from the client and communicate one or more handshake acknowledgement messages to the client in order to receive enough data from the client to make a policy decision. Once connection management system 118 receives an application layer protocol message from the client, method 500 may proceed to step 514.

At step 514, based on payload of the application layer protocol message, connection management system 118 may make a policy decision with respect to the connection between the client and the server, the policy decision defining a selected path between client and server including a chosen target device from the plurality of potential target devices. At step 516, connection management system 118 may establish a path in accordance with the policy decision, including synchronizing and/or scaling communication windows (e.g., TCP windows), performing communication sequence number rewriting (e.g., TCP sequence number rewriting) to handle sequence offsets, rewriting or modifying packet headers, and/or performing any other suitable processing for establishing the path. Such establishment of the path may also include communicating from connection management system 118 to the server the communication stored by connection management system 118 while it was waiting to make a policy decision.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using CPU 102, connection management system 118 executing thereon, and/or any other system operable to implement method 500. In certain embodiments, method 500 may be implemented partially or fully in software and/or firmware embodied in computer-readable media.

Figure 6:
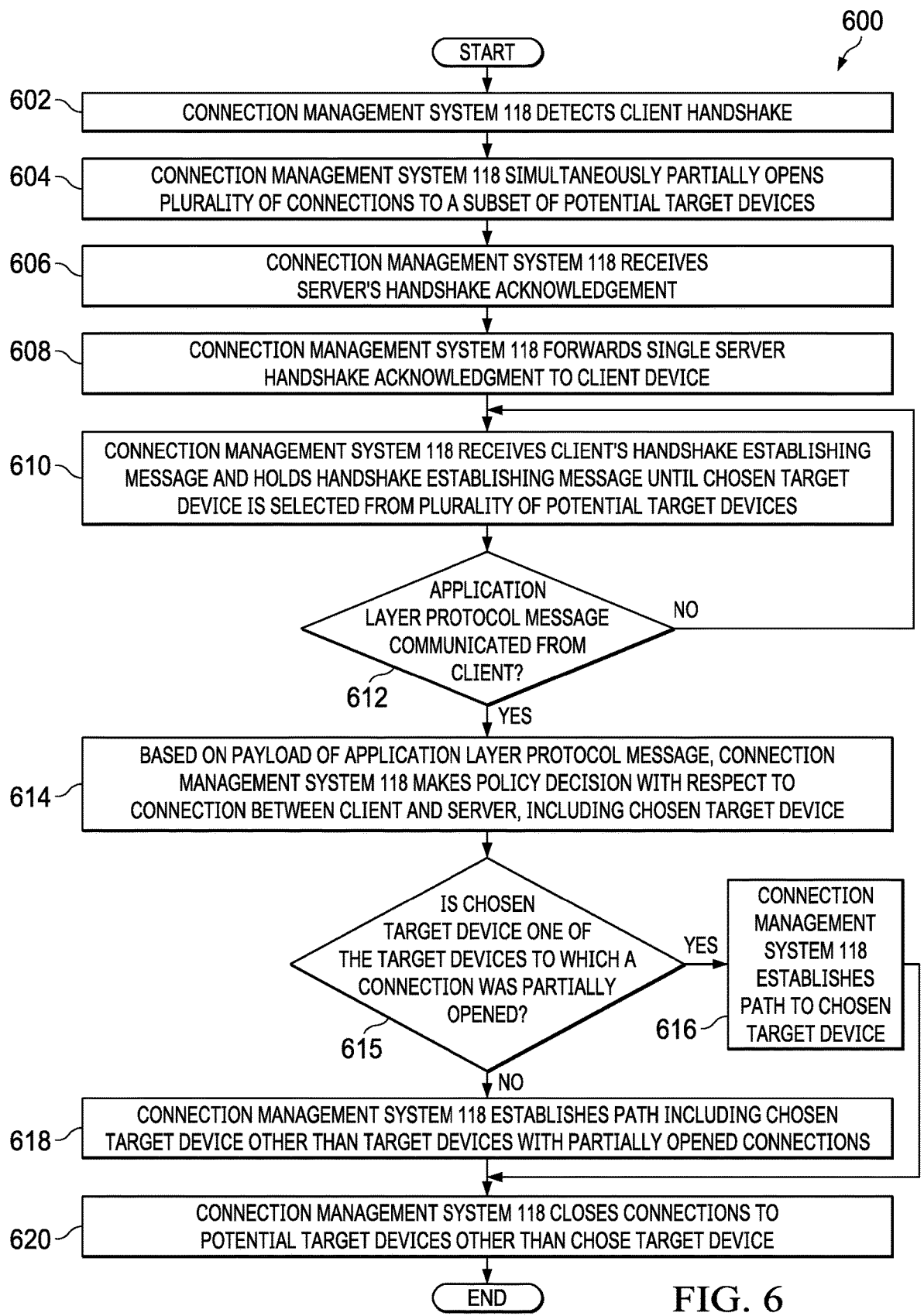
FIG. 6 illustrates a flow chart of another example method for performing a delayed proxy-less network address translation decision based on an application payload, in accordance with embodiments of the present disclosure.

FIG. 6 illustrates a flow chart of an example method 600 for performing a delayed proxy-less network address translation decision based on an application payload, in accordance with embodiments of the present disclosure. According to some embodiments, method 600 may begin at step 602. As noted above, teachings of the present disclosure may be implemented in a variety of configurations of information handling system 100. As such, the preferred initialization point for method 600 and the order of the steps comprising method 600 may depend on the implementation chosen.

At step 602, connection management system 118 may detect a client handshake (e.g., a Transport Communication Protocol (TCP) SYN message) communicated from an endpoint device 244, 246 intended for a server within external network 202. At step 604, responsive to detecting the client handshake, connection management system 118 may simultaneously partially open a plurality of connections, each connection to a potential target device. However, as opposed to method 300, rather than opening partial connections to all potential target devices, connection management system 118 may open partial connections only to a subset of all potential target devices, wherein the subset represents potential target devices more likely to be selected as the chosen target device. Such likelihood may be determined in any suitable manner, including but not limited to a previously-caches estimate for a particular application. Each potential target device may comprise a device within external network 202 through which a communication path may be established between the client device initiating the handshake and the server. In other words, each potential target device may be a "next hop" from the client in the communication path. In operation, each of the plurality of connections may be formed by communicating the client handshake to each potential target with unsupported communications options (e.g., unsupported TCP options) removed from the client handshake to allow for connection management system 118 to later modify the communication stream once a chosen target device is selected from the plurality of potential target devices.

At step 606, connection management system 118 may receive the server's handshake acknowledgement (e.g., TCP SYN ACK message) from one of the subset of potential target devices. At step 608, in response to receiving the handshake acknowledgement, connection management system 118 may forward a single server handshake acknowledgment to the client device. In operation, unsupported communications options (e.g., unsupported TCP options) may be removed from the server handshake acknowledgement to allow for connection management system 118 to later modify the communication stream once a chosen target device is selected from the plurality of potential target devices.

At step 610, connection management system 118 may receive the client's handshake establishing message (e.g., client's TCP ACK message), but may hold such handshake establishing message until the chosen target device is selected from the plurality of potential target devices.

At step 612, connection management system 118 may monitor communications from the client to the server until such time as an application layer protocol message is communicated from the client. During this step, connection management system 118 may need to actively receive an application layer protocol message, meaning it may need to process communications from the client and communicate one or more handshake acknowledgement messages to the client in order to receive enough data from the client to make a policy decision. Once connection management system 118 receives an application layer protocol message from the client, method 600 may proceed to step 614.

At step 614, based on payload of the application layer protocol message, connection management system 118 may make a policy decision with respect to the connection between the client and the server, the policy decision defining a selected path between client and server including a chosen target device from the plurality of potential target devices. At step 615, connection management system 118 may determine whether the chosen target device defined by the policy decision includes the one of the subset of the potential target devices for which connections are partially open. If the chosen target device comprises one of the subset of the potential target devices for which connections are partially open, method 600 may proceed to step 616. Otherwise, if the chosen target device is another device, method 600 may proceed to step 618.

At step 616, connection management system 118 may establish a path including the target device selected as the chosen target device. After completion of step 616, method 600 may proceed to step 620.

At step 618, connection management system 118 may establish a path including the chosen target device other than the one of the subset of potential target devices to which partial connections were open. At step 620, connection management system 118 may close the partial connections to any potential target devices which may remain open (e.g., by communicating TCP RST messages to the initial target device). After step 620, method 600 may end.

In either of the cases described in steps 616 and 618, establishing the path in accordance with the policy decision may include synchronizing and/or scaling communication windows (e.g., TCP windows), performing communication sequence number rewriting (e.g., TCP sequence number rewriting) to handle sequence offsets, rewriting or modifying packet headers, and/or performing any other suitable processing for establishing the path.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using CPU 102, connection management system 118 executing thereon, and/or any other system operable to implement method 600. In certain embodiments, method 600 may be implemented partially or fully in software and/or firmware embodied in computer-readable media.

In methods 300 and 600 described above, connection management system 118 is described as partially opening multiple connections between client and server. However, in some embodiments, connection management system 118 may in some modes open full connections between client and server. In such cases, after an application-based policy decision is made, one of the established connections may remain fully open and connection management system 118 may close all other connections.

In accordance with the systems and methods described above, the proxy-less approach described above is different from a more traditional "proxy" implementation in which two totally separated connections (one from client to connection management system, other from connection management system to selected target) are present. Both of those connections in the traditional approach requiring send and receive buffers in said connection management system. In addition, the traditional approach requires taking payload of one connection and sending it through another. Accordingly, the proxy-less approach described herein offers better performance (e.g., no need to copy payload from one connection to another), better scalability (e.g., amount of memory required per handled connection is minimal), and full network transparency (e.g., actual path maximum transmission unit may be visible to communication endpoints).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing network communication, comprising:
responsive to communication of a client handshake from a client to a server for establishing communications between the client and the server, managing handshake messages between the client and the server until an application layer message is communicated from the client, wherein the managing includes altering the client handshake by removing at least one unsupported communication option from the client handshake and transmitting the altered client handshake to the server, such that during the managing of the handshake messages, from a perspective of the client, a connection between the client and the server appears to be fully established; and
responsive to communication of the application layer message from the client:
rendering a policy decision with respect to a connection between the client and the server based on a payload of the application layer message, the policy decision defining a selected path between the client and the server and including a chosen target device from a plurality of potential target devices, wherein the chosen target device is within the selected path; and establishing the selected path for communication between the client and the server in accordance with the policy decision;

wherein the method further includes: responsive to receiving a handshake establishing message from the client, holding the handshake establishing message from the client until the policy decision is rendered and the chosen target device is selected, wherein holding the handshake establishing message includes maintaining a connection to the chosen target device in a partially opened state until the chosen target device is selected and then forwarding the handshake establishing message to the chosen target device.

2. The method of claim 1, further comprising, responsive to the communication of the client handshake and prior to rendering the policy decision, opening at least one path between the client and the server.

3. The method of claim 2, wherein:

opening at least one path between the client and the server comprises opening a plurality of partial connections from a security device to a plurality of potential target devices; and the chosen target device comprises one of the plurality of potential target devices.

4. The method of claim 3, further comprising, responsive to the rendering of the policy decision, closing the plurality of partial connections other than a connection to the chosen target device.

5. The method of claim 3, wherein managing handshake messages between the client and the server comprises:

responsive to receiving a handshake acknowledgement from one of the plurality of potential target devices, forwarding a single handshake acknowledgement to the client.

6. The method of claim 2, wherein opening at least one path between the client and the server comprises opening a single connection to an initial target device.

7. The method of claim 6, wherein the initial target device is configured to render the policy decision.

8. The method of claim 6, wherein managing handshake messages between the client and the server comprises:

responsive to receiving a handshake acknowledgement from the initial target device, forwarding the handshake acknowledgement to the client; and responsive to receiving the handshake establishing message from the client, communicating the handshake establishing message to the server.

9. The method of claim 6, further comprising buffering application layer messages from the client until the policy decision is rendered.

10. The method of claim 6, wherein:

if the initial target device is the chosen target device, establishing the selected path for communication between the client and the server, the selected path including the initial target device; and if a device other than the initial target device is the chosen target device, establishing the selected path for communication between the client and the server, the selected path including the device other than the initial target device, and closing the connection between the client and the initial target device.

11. A system comprising:

a processor; and a non-transitory, computer-readable storage medium embodying instructions executable by the processor for:

responsive to communication of a client handshake from a client to a server for establishing communications between the client and the server, managing handshake messages between the client and the server until an application layer message is communicated from the client, wherein the managing includes altering the client handshake by removing at least one unsupported communication option from the client handshake and transmitting the altered client handshake to the server, such that during the managing of the handshake messages, from a perspective of the client, a connection between the client and the server appears to be fully established; and responsive to communication of the application layer message from the client:

rendering a policy decision with respect to a connection between the client and the server based on a payload of the application layer message, the policy decision defining a selected path between the client and the server and including a chosen target device from a plurality of potential target devices, wherein the chosen target device is within the selected path; and establishing the selected path for communication between the client and the server in accordance with the policy decision;

wherein the instructions are further executable for:

responsive to receiving a handshake establishing message from the client, holding the handshake establishing message from the client until the policy decision is rendered and the chosen target device is selected, wherein holding the handshake establishing message includes maintaining a connection to the chosen target device in a partially opened state until the chosen target device is selected and then forwarding the handshake establishing message to the chosen target device.

12. The system of claim 11, the instructions further configured for, responsive to the communication of the client handshake and prior to rendering the policy decision, opening at least one path between the client and the server.

13. The system of claim 12, wherein:

opening at least one path between the client and the server comprises opening a plurality of partial connections from a security device to a plurality of potential target devices; and the chosen target device comprises one of the plurality of potential target devices.

14. The system of claim 13, the instructions further configured for, responsive to the rendering of the policy decision, closing the plurality of partial connections other than a connection to the chosen target device.

15. The system of claim 13, wherein managing handshake messages between the client and the server comprises:

responsive to receiving a handshake acknowledgement from one of the plurality of potential target devices, forwarding a single handshake acknowledgement to the client.

16. The system of claim 12, wherein opening at least one path between the client and the server comprises opening a single connection to an initial target device.

17. The system of claim 16, wherein the initial target device is configured to render the policy decision.

18. The system of claim 16, wherein managing handshake messages between the client and the server comprises:
responsive to receiving a handshake acknowledgement from the initial target device, forwarding the handshake acknowledgement to the client; and
responsive to receiving the handshake establishing message from the client, communicating the handshake establishing message to the server.

19. The system of claim 16, the instructions further configured for buffering application layer messages from the client until the policy decision is rendered.

20. The system of claim 16, wherein the instructions are further configured for:
if the initial target device is the chosen target device, establishing the selected path for communication between the client and the server, the selected path including the initial target device; and
if a device other than the initial target device is the chosen target device, establishing the selected path for communication between the client and the server, the selected path including the device other than the initial target device, and closing the connection between the client and the initial target device.

21. A non-transitory, computer-readable storage medium embodying computer executable instructions configured for:
responsive to communication of a client handshake from a client to a server for establishing communications between the client and the server, managing handshake messages between the client and the server until an application layer message is communicated from the client, wherein the managing includes altering the client handshake by removing at least one unsupported communication option from the client handshake and transmitting the altered client handshake to the server, such that during the managing of the handshake messages, from a perspective of the client, a connection between the client and the server appears to be fully established; and
responsive to communication of the application layer message from the client:
rendering a policy decision with respect to a connection between the client and the server based on a payload of the application layer message, the policy decision defining a selected path between the client and the server and including a chosen target device from a plurality of potential target devices, wherein the chosen target device is within the selected path; and
establishing the selected path for communication between the client and the server in accordance with the policy decision;
wherein the instructions are further configured for:
responsive to receiving a handshake establishing message from the client, holding the handshake establishing message from the client until the policy decision is rendered and the chosen target device is selected, wherein holding the handshake establishing message includes maintaining a connection to the chosen target device in a partially opened state until the chosen target device is selected and then forwarding the handshake establishing message to the chosen target device.

* * * * *